United States Patent [19]
Nakao et al.

[11] Patent Number: 4,545,217
[45] Date of Patent: Oct. 8, 1985

[54] STEAM GENERATING AND CONDENSING APPARATUS

[75] Inventors: Kazushige Nakao; Masaki Ikeuchi; Eiichi Ozaki; Tsuneo Yumikura, all of Hyogo, Japan

[73] Assignee: Mitsubishi Denki Kabushiki Kaisha, Tokyo, Japan

[21] Appl. No.: 669,915

[22] Filed: Nov. 9, 1984

[30] Foreign Application Priority Data

Nov. 9, 1983 [JP] Japan .................. 58-211935

[51] Int. Cl.$^4$ ............................ F25B 15/00
[52] U.S. Cl. ......................... 62/476; 62/495
[58] Field of Search .............. 62/476, 495, 148

[56] References Cited

U.S. PATENT DOCUMENTS 3,828,575 8/1974 Malcosky et al. ............ 62/476
4,424,688 1/1984 Wilkinson .................... 62/476
4,454,726 6/1984 Hibino et al. ................ 62/148

FOREIGN PATENT DOCUMENTS 549116 4/1932 Fed. Rep. of Germany .
3020693 12/1980 Fed. Rep. of Germany .

Primary Examiner—Lloyd L. King
Attorney, Agent, or Firm—Sughrue, Mion, Zinn, Macpeak & Seas

[57] ABSTRACT

A steam generating and condensing apparatus having a steam generating chamber in which a diluted solution flowing from an absorption device and containing a refrigerant absorbed therein flows outside of the pipes of a steam generating heat exchanger to evaporate the refrigerant from the diluted solution with a hot fluid flowing through the pipes of the steam generating heat exchanger, and a steam condensing chamber in which the refrigerant steam supplied through a partition from the steam generating chamber is condensed by a steam condensing heat exchanger. A double-cylinder assembly is provided composed of outer and inner cylinders, with the inner cylinder being divided by a dispersing end plate into upper and lower chambers serving as a dispersing diluted solution chamber and the steam generating chamber, respectively. The inner and outer cylinders jointly define a space in which the steam condensing chamber is disposed. The partition has eliminators on an upper portion thereof. The dispersing diluted solution pool is provided with a diluted solution inlet pipe. The steam generating chamber has a concentrated solution outlet pipe in a lower portion thereof.

5 Claims, 8 Drawing Figures

STEAM GENERATING AND CONDENSING APPARATUS

BACKGROUND OF THE INVENTION

The present invention relates to a steam generating and condensing apparatus for use in an absorption heat pump or the like.

A conventional steam generating and condensing apparatus is illustrated in FIG. 1 of the accompanying drawings. The apparatus includes a casing 1 and a partition 2 disposed therein dividing the interior thereof into a steam generating chamber 3 and a steam condensing chamber 4. Designated at 5 is a hot fluid, 6 a diluted solution, 7 a solution (hereinafter referred to as a "concentrated solution") from which refrigerant steam has been generated, 8 refrigerant steam, 9 a refrigerant liquid, and 10 cooling water. Fluids 5 through 10 are working fluids. Further, designated at 11 is a steam generating heat exchanger, 12 a steam condensing heat exchanger, 13 a hot fluid inlet pipe, 14 a hot fluid outlet pipe, 15 a diluted-solution inlet pipe, 16 a concentrated-solution outlet pipe, 17 a solution pump, 18 a refrigerant pump, 19 a bypass pipe, and 20 a solenoid-operated valve. The components denoted at 11 through 20 constitute the piping of the heat generating and condensing apparatus. The hot fluid inlet pipe 13 is connected to the steam generating heat exchanger 11, which is connected to the hot fluid outlet pipe 14, so that the hot fluid 5 flows from the inlet pipe 13 through the heat exchanger 11 out of the outlet pipe 14. The cooling water 10 flows through and is discharged out of the steam condensing heat exchanger 12.

The diluted solution 6 from an absorption chamber (not shown in FIG. 1) in an absorption device flows from the diluted-solution inlet pipe 15 into the steam generating chamber 3 in the casing 1. The diluted solution 6 then passes along the outer pipe surfaces of the steam generating heat exchanger 11 filled with the hot fluid and is vaporized or boiled on the outer pipe surfaces of the heat exchanger 11 due to the heat from the hot fluid flowing therethrough. The refrigerant in the diluted solution 6 is subjected to a phase change to produce refrigerant steam 8 which flows in a direction (indicated by dotted-line arrows) from the steam generating chamber 3 into the adjacent steam condensing chamber 4. The diluted solution 6 is concentrated as it passes along the outer pipe surfaces of the heat exchanger 11 and is thereby turned into the concentrated solution 7, which is pumped by the solution pump 17 through the concentrated-solution outlet pipe 16 into the absorption chamber in the absorption device. The refrigerant steam 8 generated in the steam generating chamber 3 is displaced into the steam condensing chamber 4 due to a pressure difference, and then cooled by the cooling water 10 flowing through the pipes of the steam condensing heat exchanger 12. The steam 8 is condensed on the outer pipe surfaces of the heat exchanger 12 and turned into the refrigerant liquid 9, which is pumped by the refrigerant pump 18 partly into an evaporation chamber (not shown in FIG. 1) in the absorption device and partly through the bypass pipe 19 into the concentrated solution 7 for adjusting the concentration thereof.

In the above conventional steam generating apparatus, it is required to adjust the rate of flow, the temperature, the concentration of the diluted solution 6, and the rate of flow of the hot fluid 5 passing through the steam generating heat exchanger 11 for controlling the generated steam, and it is also required to adjust the rate of flow and the temperature of the cooling water 10 flowing through the steam condensing heat exchanger 12 for controlling the condensed steam. Therefore, it has been highly difficult to control the generated and condensed steam. For example, when the refrigerant liquid 9 is condensed, the concentrated solution flowing out of the concentrated-solution outlet pipe 16 has a high concentration. To cause the concentrated solution to have a desired concentration, the apparatus has required the bypass pipe 19 to reflux the refrigerant liquid 9 into the concentrated solution 7 and the solenoid-operated valve 20 to adjust the rate of flow of the refluxed refrigerant liquid 9. Conversely, when the concentrated solution has a low concentration, it has been necessary to control the rate of flow and the temperature of the cooling water 10.

The difference between the temperatures inside and outside of the heat transfer pipe walls of the steam generating heat exchanger 11 immersed in the solution is reduced because of a substantial increase in the boiling point due to the height of the column of the solution. When the solution boils on the outer wall surfaces of the heat exchanger 11, generated steam bubbles, which may be combined under a certain thermal load, form a steam film surrounding the outer pipe surfaces, which presents a large thermal resistance, lowering the steam generating capability to a large extent.

SUMMARY OF THE INVENTION

The present invention has been made with a view of eliminating the foregoing shortcomings. It is specifically an object of the present invention to provide a steam generating and condensing apparatus having an increased steam generating capability, which is capable of self-controlling generated and condensed steam without controlling the flow rate and temperature of working fluids upon variation of the steam condensing capability, and which requires no refrigerant liquid bypass pipe and no solenoid-operated valve.

The above as well as other objects of the invention are met by a steam generating and condensing apparatus having a steam generating chamber in which a diluted solution flowing from an absorption device and containing a refrigerant absorbed therein flows outside of the pipes of a steam generating heat exchanger to evaporate the refrigerant from the diluted solution with a hot fluid flowing through the pipes of the steam generating heat exchanger, and a steam condensing chamber in which the refrigerant steam supplied through a partition from the steam generating chamber is condensed by a steam condensing heat exchanger. In accordance with the invention, a double-cylinder assembly is provided composed of outer and inner cylinders, with the inner cylinder being divided by a dispersing end plate into upper and lower chambers serving as a dispersing diluted solution chamber and the steam generating chamber, respectively. The inner and outer cylinders jointly define a space in which the steam condensing chamber is disposed. The partition has eliminators on an upper portion thereof. The dispersing diluted solution pool is provided with a diluted solution inlet pipe. The steam generating chamber has a concentrated solution outlet pipe in a lower portion thereof.

DESCRIPTION OF THE PREFERRED EMBODIMENTS

Figure 1:
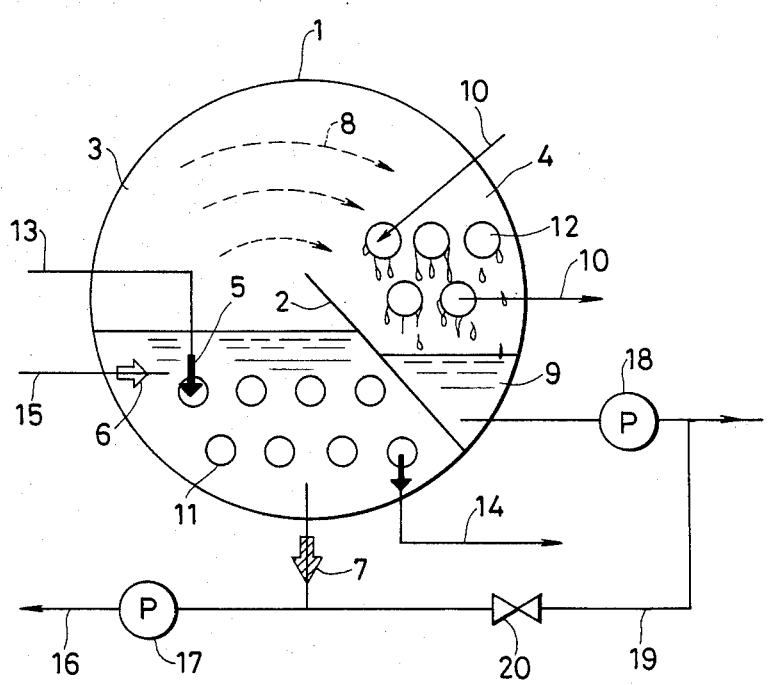
FIG. 1 is a diagram of a conventional steam generating and condensing apparatus.
Figure 2:
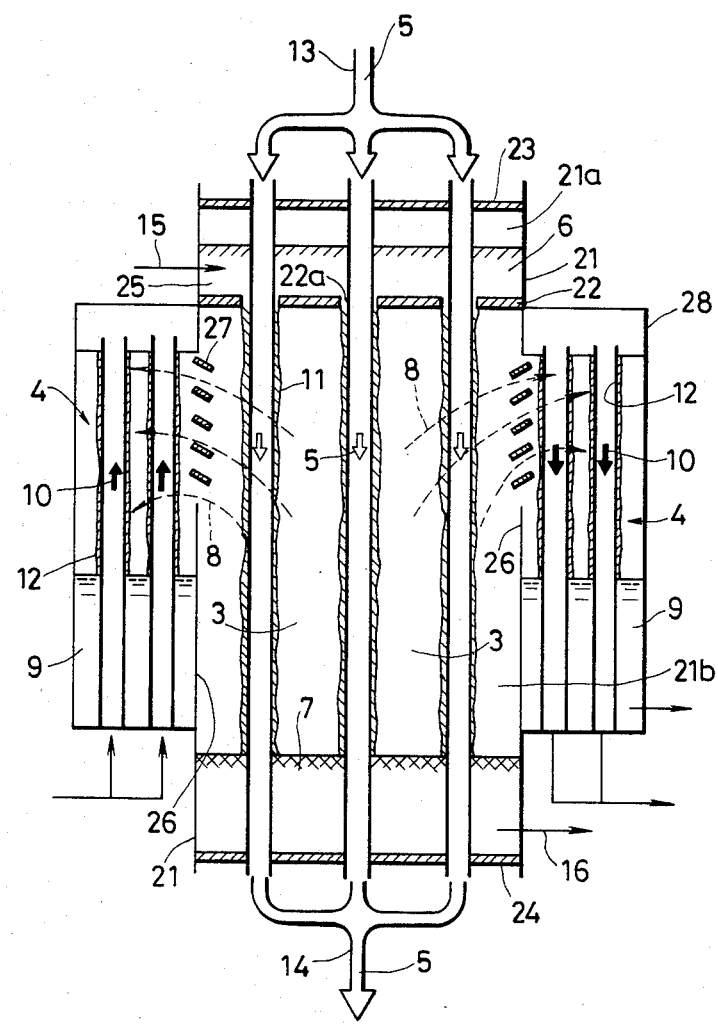
FIG. 2 is a diagram of a steam generating and condensing apparatus according to a preferred embodiment of the present invention.

The present invention will now be described with reference to a preferred embodiment shown in FIG. 2. Identical or corresponding parts in FIG. 2 are denoted by identical or corresponding reference numerals in FIG. 1. Steam generating heat exchangers 11 are erected substantially vertically within a steam generating chamber 3. The interior of an inner cylinder 21 is divided into an upper chamber 21a and a lower chamber 21b by a dispersing end plate 22 having dispersing holes 22a. The steam generating heat exchangers 11 extend through the dispersing holes 22a and have upper ends fixed to an upper end plate 23 and lower ends fixed to a lower end plate 24. The upper chamber 21a is enclosed at its upper portion by the upper end plate 23, at its side portion by the inner cylinder 21, and at its lower portion by the dispersing end plate 22 having the dispersing holes 22a. A diluted solution 6 flowing in from an absorption device (not shown in FIG. 2) temporarily remains in the upper chamber 21a, thus defining a dispersing diluted-solution pool 25. The steam generating chamber 3 in the inner cylinder 21 is separated from a steam condensing chamber 4 by a partition 26 having eliminators 27. Steam condensing heat exchangers 12 are erected substantially vertically in a space defined between the inner cylinder 21 and an outer cylinder 28 and serve as the steam condensing chamber 4. Cooling water 10 flows through the pipes of the heat exchanger 12.

Operation of the apparatus thus constructed according to the present invention is as follows: The diluted solution 6 flowing from the absorption chamber (not shown) through a diluted solution inlet pipe 15 into the dispersing diluted solution pool 25 is dispersed toward the steam generating heat exchangers 11 through the dispersing holes 22a at the gaps between the dispersing end plate 22 and the steam generating heat exchanger 11. The amount of the diluted solution dispersed is dependent on the level of the diluted solution 6 in the dispersing diluted solution pool 25, that is, the level determined as the influx of the diluted solution 6 increases or decreases, and the interval between the dispersing holes 22a, the surface roughness, and machining accuracy of the edges of the gaps in the dispersing holes 22a. The dispersed diluted solution 6 flows down the outer pipe surfaces of the heat exchangers 11 into a pool of concentrated solution 7 below the steam generating chamber 3. At this time, the film of the diluted solution 6 on the outer pipe surfaces of the heat exchangers 11 is heated by a hot fluid 5 flowing from a hot fluid inlet pipe 13 above the heat exchangers 11 into the latter. The film of the diluted solution 6 is vaporized or boiled to generate refrigerant steam 8. Therefore, the diluted solution 6 becomes progressively higher in concentration as it gives off the refrigerant steam 8, turning into the concentrated solution 7 having a prescribed concentration which is fed from a concentrated solution outlet pipe 16 into an absorption chamber. The hot-fluid 5 is discharged from a lower hot fluid outlet pipe 14. The generated refrigerant steam 8 is displaced from the steam generating chamber 3 into the steam condensing chamber 4 due to a pressure difference, and is cooled by the cooling water 10 flowing through the steam condensing heat exchanger 12, condensed on the outer pipe surfaces of the heat exchanger 12 into a refrigerant liquid 9 flowing down the outer pipe surfaces into a lower refrigerant liquid pool, from which the refrigerant liquid 9 is delivered to an evaporation chamber (not shown in FIG. 2).

The eliminators 27 serve to prevent the solution from being scattered into the steam condensing chamber 4 due to steam bubbles formed when the solution boils on the outer pipe surfaces of the heat exchangers 11. As the steam condensing capability is increased, the level of the refrigerant liquid 9 in the steam condensing chamber 4 is raised to immerse lower portions of the vertical heat exchangers 12 in the refrigerant liquid 9, whereupon the surface areas of the heat exchangers 12 available for steam condensation are reduced, as is the steam condensing capability. If the concentration of the concentrated solution 7 in a lower portion of the steam generating chamber 3 becomes higher than a desired level when the steam condensing capability is increased, the refrigerant liquid 9 with its level increased overflows through gaps in the eliminators 27 into the steam generating chamber 3 so that the concentration of the solution 7 will return to the desired level. Conversely, when the level of the refrigerant solution 9 is lowered as the steam condensing capability is lowered, the steam condensing heat exchangers 12 have more exposed areas emerging from the refrigerant liquid 9. As a result, the steam condensing areas are increased to increase the steam condensing capability. Therefore, the apparatus is capable of selfadjusting the steam condensing capability as the latter is varied.

Figure 3:
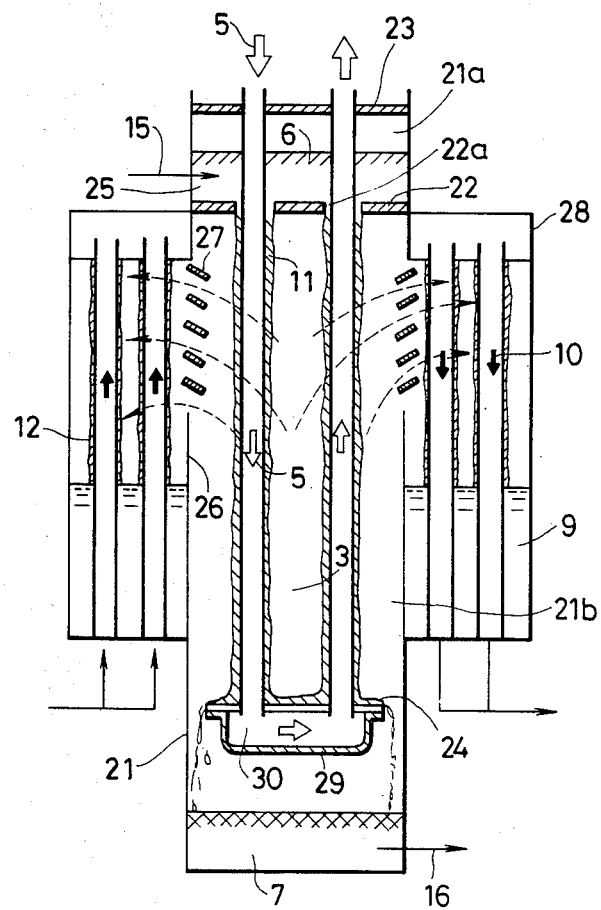
FIG. 3 is a diagram of a steam generating and condensing apparatus according to another embodiment of the present invention.

Another embodiment of the present invention will be described with reference to FIG. 3. Identical or corresponding parts in FIG. 3 are denoted by identical or corresponding reference numerals in FIG. 2. A cover 29 is attached to a lower end plate 24 for causing a hot fluid 5 flowing from upper ends of steam generating heat exchangers 11 downwardly into the pipes of the heat exchangers 11 to change its direction of flow through a flow passage 30 defined by the cover 29 and the lower end plate 24. The hot fluid 5 then flows upwardly out of the upper ends of the heat exchangers 11. With the cover 29 thus attached to the lower end plate 24, the steam generating heat exchangers 11 jointly provide a U shape above the level of the solution to provide constant surface areas available for evaporation. This arrangement solves the problem which would be experienced with the above embodiment (FIG. 2) in the case where an increase in the steam generating capability in the steam generating chamber 3 causes the level of the lower pool of the concentrated solution 7 to be lowered, increasing the surface areas, and resulting in a further increase in the steam generating capability.

Figure 4:
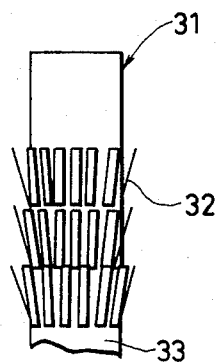
FIG. 4 is a side elevational view of a steam generating heat exchanger for use in the apparatus of the invention.
Figure 5:
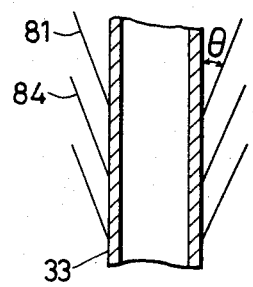
FIG. 5 is a cross-sectional view of the steam generating heat exchanger shown in FIG. 4.
Figure 6:
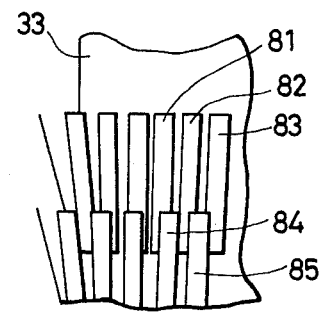
FIG. 6 is a fragmentary side elevational view of fins on the heat exchanger of FIG. 4.

FIGS. 4, 5 and 6 illustrate a steam generating heat exchanger 31 suitable for use in the apparatus of the present invention. The heat exchanger has tooth-shaped fins 32, 81 to 85 directed at an angle of $\theta$ with respect to a tube 33 of the heat exchanger 1 as shown in FIG. 5. These gaps between the adjacent tooth-shaped fins 81 to 85 and between these tooth-shaped fins 81 to 85 and the tube 33 allow a diluted solution to flow therethrough. As shown in FIGS. 5 and 6, the fins 81 and 84 adjacent to each other in an axial direction of the heat exchanger 1 partly overlap when viewed in a direction normal to the axis of the heat exchanger 31. The angle $\theta$ is preferably in a range of from 5° to 50°.

Figure 7:
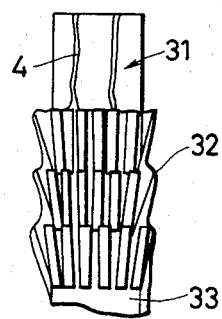
FIG. 7 is a side elevational view showing the manner in which a solution flows down the heat exchanger of FIG. 4.

In operation, when a diluted solution is supplied to the heat exchanger, the diluted solution flows down the tube 33 while filling the gaps between the axially adjacent tooth-shaped fins 81 and 84. The solution also spreads due to capillary action between the circumferentially adjacent tooth-shaped fins 81, 82 and 83. Therefore, the solution flows downwardly while forming a solution film over all of the heat exchanger 31 as shown in FIG. 7.

Since the tooth-shaped fins 32 present a resistance to the downward flow of the solution, the solution 4 flows at a rate less than that at which the solution flows in the conventional steam generating apparatus. As a result, the fins 32 provide an increased mass transfer rate.

As the solution is held between the toothshaped fins 81 to 85 due to capillary action, the thickness of the solution film surrounding the heat exchanger 31 remains substantially constant so that the characteristics of the steam generating apparatus are not adversely affected.

Figure 8:
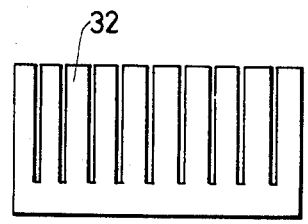
FIG. 8 is a side elevational view of fins that can be attached to a heat exchanger tube.

The fins 32 may be of other shapes, and may be arranged regularly or irregularly. The fins 32 may be formed by cutting the surface of the heat exchanger tube 33 or winding separately prepared teeth 32 as shown in FIG. 8 around the tube 33.

We claim:

1. A steam generating and condensing apparatus having a steam generating chamber in which a diluted solution flowing from an absorption device and containing a refrigerant absorbed therein flows outside of the pipes of a steam generating heat exchanger to evaporate the refrigerant from the diluted solution with a hot fluid flowing through the pipes of the steam generating heat exchanger, and a steam condensing chamber in which the refrigerant steam supplied through a partition from the steam generating chamber is condensed by a steam condensing heat exchanger, wherein the improvement comprises a double-cylinder assembly composed of outer and inner cylinders, said inner cylinder being divided by a dispersing end plate into upper and lower chambers serving as a dispersing diluted solution pool and said steam generating chamber, respectively, said outer and inner cylinders jointly defining a space in which said steam condensing chamber is disposed, said partition having eliminators on an upper portion thereof, said dispersing diluted solution pool having a diluted solution inlet pipe, and said steam generating chamber having a concentrated solution outlet pipe in a lower portion thereof.

2. The steam generating and condensing apparatus according to claim 1, wherein said steam generating heat exchanger comprises a plurality of needleshaped or tooth-shaped fins fixed to an outer circumferential surface thereof and inclined upwardly.

3. The steam generating and condensing apparatus according to claim 1, wherein said steam generating heat exchanger is positioned substantially vertically within said steam generating chamber and extends through dispersing holes in said dispersing end plate, said steam generating heat exchanger having upper and lower ends fixed respectively to upper and lower end plates of said inner cylinder.

4. The steam generating and condensing apparatus according to either one of claims 1 and 2, wherein said steam condensing heat exchanger is positioned substantially vertically.

5. The steam generating and condensing apparatus according to any one of claims 1, 2 and 3, further comprising a cover attached to a lower end of said steam generating heat exchanger for causing said hot fluid to flow back therein.

* * * * *